United States Patent Office 2,930,780
Patented Mar. 29, 1960

2,930,780
POLYPEPTIDE FORMATION USING PENTA-METHYL GUANIDINE AS CATALYST

Frederick John Weymouth, Coventry, England, assignor to Courtaulds Limited, London, England, a British company No Drawing. Application January 6, 1958
Serial No. 707,130
Claims priority, application Great Britain
February 22, 1955
1 Claim. (Cl. 260—77.5)

This invention relates to the production of polyamides.

This application is a continuation-in-part application of my application Ser. No. 563,201, filed February 3, 1956.

This invention is particularly concerned with the production of synthetic polypeptides by polymerising anhydrocarboxyamino-acids having the general formula:

$$\begin{array}{c} R-CH\!-\!\!-\!\!C\!=\!O \\ |\quad\quad\quad| \\ NH\quad O \\ \diagdown\!\!\diagup \\ C \\ \| \\ O \end{array}$$

R being an alkyl or aralkyl group, which may be substituted with an inactive substituent group such as an ester group. Examples of suitable anhydrocarboxyamino acids are as follows, the R groups being indicated in brackets:

The anhydrocarboxyamino acid of gamma-benzyl-L-glutamate ($C_6H_5$—$CH_2$—O—OC—$CH_2$—$CH_2$—) D, L and DL alanine (—$CH_3$), of DL-beta-phenyl-alanine ($C_6H_5$—$CH_2$—), of gamma-methyl-L-glutamate ($CH_3$—O—OC—$CH_2$—$CH_2$—)

of leucine

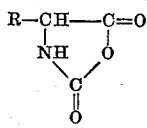

of isoleucine

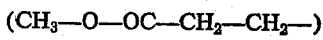

of norleucine ($CH_3$—$CH_2$—$CH_2$—$CH_2$—), of epsilon-N carboxy-benzoxy lysine ($C_6H_5$-$CH_2$-O-OC-NH-$CH_2$-$CH_2$-$CH_2$-$CH_2$-)

of ortho-acetyl tyrosine

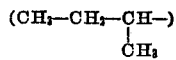

and also alpha-amino-N-butyric anhydrocarboxy amino acid ($CH_3$—$CH_2$—$CH_2$—).

The term "polypeptide" as used in this specification means a polyamide built up with a recurrent $$\begin{array}{c} R \\ | \\ -CH-NH-CO- \end{array}$$

group and obtained by polymerising an anhydrocarboxyamino-acid having the formula defined above.

It is known that anhydrocarboxyamino-acids can be polymerised by heating, either alone or in the presence of certain catalysts, the polymerisation being accompanied by the evolution of carbon dioxide. The catalysts generally proposed hitherto are water, tertiary bases such as pyridine, and compounds of the type XH in which H is an active hydrogen atom, and X is R—NH— or

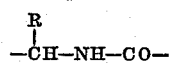

where R, $R_1$ and $R_2$ are alkyl or aryl radicals, or $R_3$—O— where $R_3$ is an aryl radical, such compounds being primary amines, secondary amines and phenols. Acids having an ionization constant at 25° C. in the range of $2.25 \times 10^{-3}$ to $6 \times 10^{-7}$ may also be used.

The object of this invention is to promote rapid polymerisation of anhydrocarboxyamino-acids.

In accordance with the present invention the polymerisation of one or more anhydrocarboxyamino-acids is effected in solution in the presence of penta-methyl guanidine. The penta-methyl guanidine is preferably added to the anhydrocarboxyamino-acid as a solution for example in N-methyl formamide.

The polymerisation of the anhydrocarboxyamino-acid is effected in solution. Suitable solvents are benzene, nitrobenzene, chlorbenzene, acetophenone, dioxane, methylene chloride, chloroform, dimethyl formamide and mixtures of these compounds, the actual choice of solvent depending on the solubility properties of the original anhydrocarboxyamino-acid or acids and the resulting polypeptide. The polymerisation can be carried out at varying temperatures; temperatures ranging from 0°–100° C. have been used successfully. For economic reasons it is preferred to use ordinary temperatures.

The invention is illustrated by the following example in which parts are by weight.

*Example*

5 parts of the N-carbonic anhydride of gamma-benzyl-L-glutamate were dissolved in 100 parts of dioxane. A solution of 0.032 part of pentamethyl guanidine (1.32 mol percent based on the weight of the anhydride) in 1 part of N-methyl formamide was added with stirring. The resultant solution was stirred for 15 minutes at 25° C. in an evacuated container while a rapid evolution of carbon dioxide occurred. The polymer was precipitated by the addition of 2000 parts of ether.

The product obtained was a colourless fibre-forming polymer; its reduced viscosity in dichloracetic acid was 0.56. Reduced viscosity is given by $$\frac{\eta_{sp}}{c}$$

where $\eta_{sp}$ is the specific viscosity of a polymer solution having a concentration (c) of 0.5 gram per 100 cc. of solvent.

The procedure described in the example may be used for polymerising other anhydrocarboxyamino acids such as the N-carbonic anhydride of DL-β-phenylalanine.

What I claim is:

A process for the production of polyamides which consists essentially of dissolving in a solvent chosen from the group consisting of benzene, nitrobenzene, chlorbenzene, acetophenone, dioxane, methylene chloride, chloroform, dimethyl formamide, and mixture of these compounds, an anhydrocarboxyamino acid having the general formula:

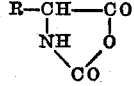

where R is a radical chosen from the group consisting of alkyl and aralkyl groups and alkyl and aralkyl groups substituted by a group having the general formula —COOX, where X is selected from the class consisting of methyl and benzyl groups and pentamethyl guanidine as polymerisation initiator, and maintaining the temperature of the resultant solution at 0° C. to 100° C. whereby carbon dioxide is evolved and polymerisation of the anhydrocarboxyamino acid is effected.

References Cited in the file of this patent
FOREIGN PATENTS
675,298    Great Britain _____ July 9, 1952